US012332594B2

(12) United States Patent
Kikuchi et al.

(10) Patent No.: US 12,332,594 B2
(45) Date of Patent: Jun. 17, 2025

(54) IMAGE FORMING SYSTEM AND IMAGE FORMING APPARATUS

(71) Applicant: CANON KABUSHIKI KAISHA, Tokyo (JP)

(72) Inventors: Kyohei Kikuchi, Ibaraki (JP); Masami Hano, Chiba (JP); Yoshiro Tsukada, Chiba (JP); Toshiyuki Yamada, Tokyo (JP); Shingo Hirota, Ibaraki (JP); Taro Hanazato, Tokyo (JP); Daisuke Katayama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/348,453

(22) Filed: Jul. 7, 2023

(65) Prior Publication Data

US 2024/0012354 A1 Jan. 11, 2024

(30) Foreign Application Priority Data

Jul. 8, 2022 (JP) ................................ 2022-110180

(51) Int. Cl.

| | |
|---|---|
| ***G03G 15/20*** | (2006.01) |
| ***B05D 3/06*** | (2006.01) |
| ***G03G 9/09*** | (2006.01) |
| ***G03G 9/12*** | (2006.01) |
| ***G03G 15/00*** | (2006.01) |
| ***G03G 15/04*** | (2006.01) |

(52) U.S. Cl.

CPC ......... *G03G 15/2098* (2021.01); *B05D 3/061* (2013.01); *G03G 9/0904* (2013.01); *G03G 9/122* (2013.01); *G03G 15/04018* (2013.01); *G03G 15/6585* (2013.01); *G03G 2215/00426* (2013.01); *G03G 2215/2074* (2013.01)

(58) Field of Classification Search

CPC ........... G03G 15/6585; G03G 15/2098; G03G 15/04018; G03G 2215/00426

See application file for complete search history.

(56) References Cited

U.S. PATENT DOCUMENTS

| | | | | |
|---|---|---|---|---|
| 2009/0286177 A1* | 11/2009 | Tyagi | G03G 9/0821 430/124.1 |
| 2010/0080582 A1* | 4/2010 | Sato | G03G 15/0121 399/51 |
| 2016/0274487 A1* | 9/2016 | Kusakabe | G03G 15/065 |

(Continued)

OTHER PUBLICATIONS

U.S. Appl. No. 18/219,164, Shingo Hirata, Yoshiro Tsukada, Masami Hano, Toshiyuki Yamada, Kyohei Kikuchi, Daisuke Katayama, Taro Hanazato, Jul. 7, 2023.

(Continued)

*Primary Examiner* — Carla J Therrien

(74) *Attorney, Agent, or Firm* — Venable LLP

(57) ABSTRACT

An image forming system includes an image forming unit including a first photosensitive member, a first developing unit, a second photosensitive member, a second developing unit, a third photosensitive member, a third developing unit, a fourth photosensitive member, and a fourth developing unit; a varnish applying unit; an irradiation unit; and a controller configured to control image formation by the image forming unit to form a black image, on which the varnish is superimposed, with yellow toner, magenta toner, and cyan toner.

8 Claims, 6 Drawing Sheets

(56) References Cited

U.S. PATENT DOCUMENTS

2019/0193415 A1 6/2019 Yamamoto

OTHER PUBLICATIONS

U.S. Appl. No. 18/221,051, Toshiyuki Yamada, Yoshirio Tsukada, Masami Hano, Shingo Hirota, Taro Hanazato, Daisuke Katayama, Kyohei Kikuchi, filed Jul. 12, 2023.
U.S. Appl. No. 18/226,115, Daisuke Katayama, Yoshiro Tsukada, Masami Hano, Shingo Hirota, Toshiyuki Yamada, Taro Hanazato, Kyohei Kikuchi, filed Jul. 25, 2023.
U.S. Appl. No. 18/229,868, Taro Hanazato, Yoshiro Tsukada, Masami Hano, Shingo Hirota, Toshiyuki Yamada, Daisuke Katayama, Kyohei Kikuchi, filed Aug. 3, 2023.

* cited by examiner

IMAGE FORMING SYSTEM AND IMAGE FORMING APPARATUS

FIELD OF THE INVENTION AND RELATED ART

The present disclosure relates to an image forming system for forming a toner image on a recording material and for applying varnish to the recording material and an image forming apparatus for forming the toner image on the recording material.

In recent years, separately from a toner image formed on a recording material with a developer, a varnish image is formed on the recording material with colorless and transparent varnish in order to decorate the toner image. United States Patent Application Publication No. 2019/0193415A1 proposes a varnish applying apparatus (referred to as a varnish coater) in which varnish capable of being solidified by ultraviolet irradiation is applied and thereafter is solidified by irradiating the varnish with the ultraviolet irradiation and in which the varnish image is thus capable of being formed.

SUMMARY OF THE INVENTION

According to an aspect of the present disclosure, there is provided an image forming system comprising: an image forming unit configured to form a toner image on a recording material and including a first photosensitive member, a first developing unit for developing an electrostatic latent image, formed on the first photosensitive member, with black toner containing carbon black, a second photosensitive member, a second developing unit for developing an electrostatic latent image, formed on the second photosensitive member, with yellow toner not containing carbon black, a third photosensitive member, a third developing unit for developing an electrostatic latent image, formed on the third photosensitive member, with magenta toner not containing carbon black, a fourth photosensitive member, and a fourth developing unit for developing an electrostatic latent image, formed on the fourth photosensitive member, with cyan toner not containing carbon black; a varnish applying unit configured to apply varnish to the recording material, wherein the varnish is cured by being irradiated with ultraviolet radiation; an irradiation unit configured to irradiate the varnish on the recording material with light to cure the varnish on the recording material; and a controller configured to control image formation by the image forming unit to form a black image, on which the varnish is superimposed, with the yellow toner, the magenta toner, and the cyan toner.

According to another aspect of the present disclosure, there is provided an image forming apparatus comprising: an image forming unit configured to form a toner image on a recording material and including a first photosensitive member, a first developing unit for developing an electrostatic latent image, formed on the first photosensitive member, with black toner containing carbon black, a second photosensitive member, a second developing unit for developing an electrostatic latent image, formed on the second photosensitive member, with yellow toner not containing carbon black, a third photosensitive member, a third developing unit for developing an electrostatic latent image, formed on the third photosensitive member, with magenta toner not containing carbon black, a fourth photosensitive member, and a fourth developing unit for developing an electrostatic latent image, formed on the fourth photosensitive member, with cyan toner not containing carbon black; and a controller configured to control image formation by the image forming unit to form a black image, on which the varnish is superimposed, with the yellow toner, the magenta toner, and the cyan toner.

Further features of the present invention will become apparent from the following description of exemplary embodiments with reference to the attached drawings.

DESCRIPTION OF THE EMBODIMENTS

First Embodiment

First, an image forming system according to an embodiment will be described using FIG. 1. An image forming system 1X shown in FIG. 1 includes an image forming apparatus 100 for forming a toner image on a recording material S and a varnish applying apparatus (varnish coater) 200 for forming a varnish image on the recording material S. The varnish coater 200 is a post-step unit capable of being retrofitted to the image forming apparatus 100 for expanding a function thereof, and the image forming apparatus 100 and the varnish coater 200 are connected to each other so as to be capable of delivering the recording material S therebetween. Further, the image forming apparatus 100 and the varnish coater 200 are connected by data input/output interface (not shown) so that control signals, data, and the like are capable of being sent and received therebetween. The recording material S on which the toner image is formed by the image forming apparatus 100 is conveyed to the varnish coater 200 for the purpose of improving glossiness, water-resistance, abrasion resistance, and the like of the toner image formed on the recording material S, and then, by the varnish coater 200, the varnish image is formed on the recording material S separately from the toner image. Formation of the varnish image by the varnish coater 200 will be described later.

Figure 1:
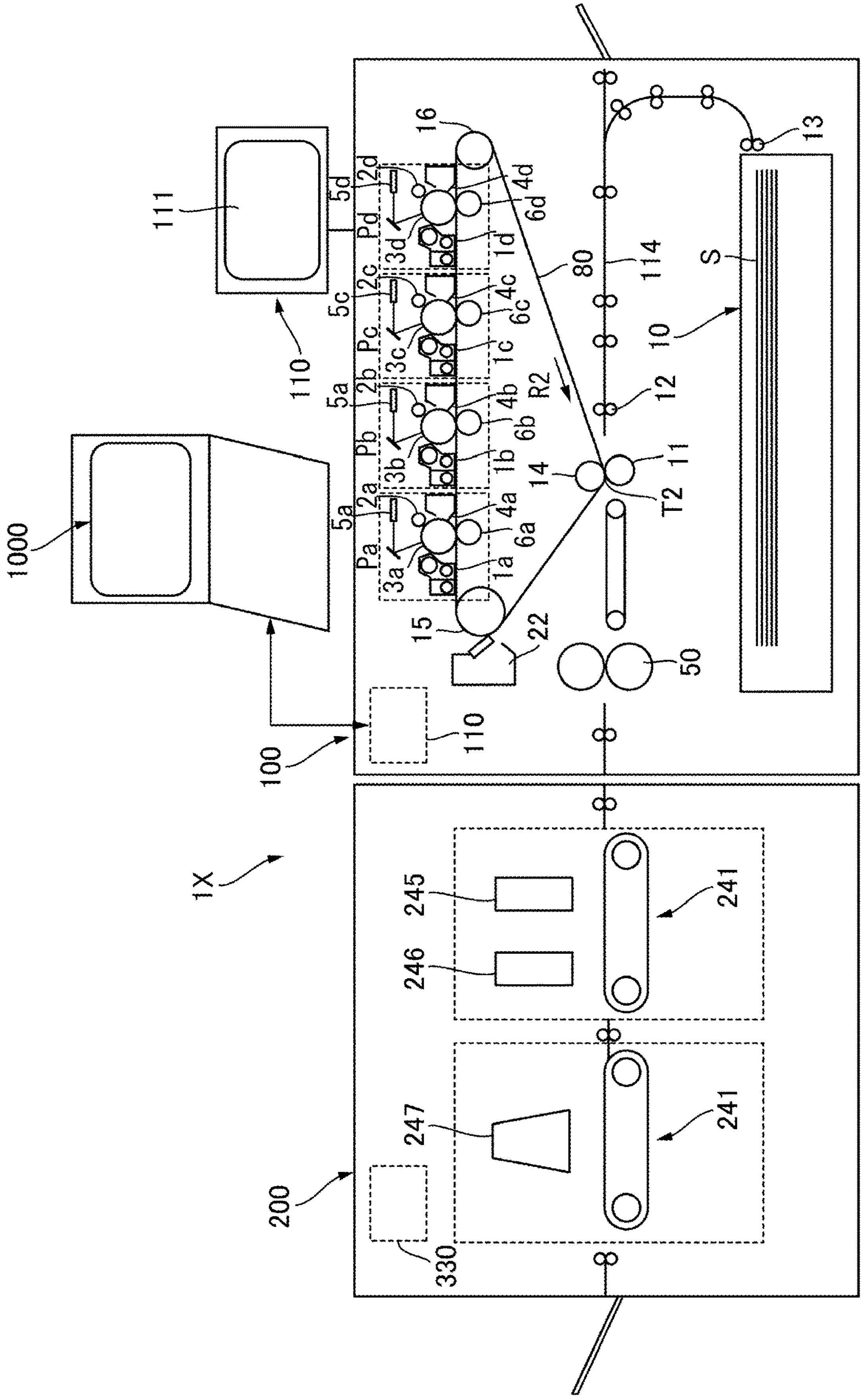
FIG. 1 is a schematic view showing a constitution of an image forming system.

Incidentally, although omitted from illustration in FIG. 1, the image forming apparatus 1X may also be provided with other post-step units such as a relay apparatus and a finisher apparatus. The relay apparatus is disposed between the image forming apparatus 100 and the varnish coater 200, and sends the recording material S conveyed from the image forming apparatus 100 to the varnish coater 200 after turning the recording material S upside down or after being temporarily stacked. The finisher apparatus performs, for example, punching for perforating the recording material S or stapling in which a plurality of recording materials S are stacked and stapled, or the like process, and then the perforated recording material S or the stapled recording materials S are discharged to a discharge tray. Further, in addition to such a post-step unit, for example, a recording material supplying apparatus (not shown) in which a large number of recording materials S are capable of being accommodated is provided, and the recording materials may be supplied from the recording material supplying apparatus to the image forming apparatus 100.

<Image Forming Apparatus>

The image forming apparatus 100 will be described. The image forming apparatus 100 is a tandem full-color printer of an electrophotographic type. The image forming apparatus 100 includes image forming portions Pa, Pb, Pc, and Pd for forming images of yellow, magenta, cyan, and black, respectively. The image forming apparatus 100 forms a toner image on the recording material S on the basis of data relating to the toner image contained in image data sent from an image reading apparatus (not shown) connected to the image forming apparatus 100 or from an external device 1000 such as a personal computer. As the recording material S, it is possible to cite sheet materials such as plain paper, thick paper, rough paper, uneven paper, coated paper, and the like.

A feeding process of the recording materials S of the image forming apparatus 100 will be described. The recording materials S are accommodated in a cassette 10 in a stacked form, and are sent from the cassette 10 in synchronism with an image forming timing by a supplying roller 13. Each recording material S sent by the supplying roller 13 is fed to a registration roller pair 12 provided at an intermediate position of a feeding path 114. Then, in the registration roller pair 12, oblique movement correction and timing correction of the recording material S are made, and thereafter, the recording material S is sent to a secondary transfer portion T2. The secondary transfer portion T2 is a transfer nip formed as a transfer portion by an inner secondary transfer roller 14 and an outer secondary transfer roller 11, and the toner image is transferred onto the recording material in response to application of a secondary transfer voltage to the outer secondary transfer roller 11.

With respect to the above-described feeding process of the recording material S to the secondary transfer portion T2, an image forming process of the image sent to the secondary transfer portion T2 at a similar timing will be described. First, the image forming portions will be described, but the image forming portions Pa, Pb, Pc, and Pd for the respective colors are constituted substantially similar to each other except that colors of toners used in developing devices 1*a*, 1*b*, and 1*c* as a plurality of second developing portions are yellow (Y), magenta (M), and cyan (C) and that a color of toner used in a developing device 1*d* as a first developing portion is black (K). Therefore, in the following, as a representative, the image forming portion Pd for black will be described, and other image forming portions Pa, Pb, and Pc are omitted from description. Incidentally, in this embodiment, photosensitive drums 3*a*, 3*b*, and 3*c* correspond to a plurality of second photosensitive members, and a photosensitive drum 3*d* corresponds to a first photosensitive member. Further, exposure devices 5*a*, 5*b*, and 5*c* correspond to a plurality of second exposure portions, and an exposure device 5*d* corresponds to a first exposure portion.

The image forming portion Pd is constituted principally by the developing device 1*d*, a charging device 2*d*, the photosensitive drum 3*d*, a photosensitive drum cleaner 4*d*, an exposure device 5*d*, and the like.

A surface of the photosensitive drum 3*d* is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary-transferred onto an intermediary transfer belt 80 in response to application of a primary transfer voltage to a primary transfer roller 6*d* disposed opposed to the image forming portion Pd while sandwiching the intermediary transfer belt 80 therebetween. Primary transfer residual toner slightly remaining on the photosensitive drum 3*d* is collected to the photosensitive drum cleaner 4*d*.

The intermediary transfer belt 80 is stretched by the inner secondary transfer roller 14, and stretching rollers 15 and 16, and is driven in an arrow R2 direction. In the case of this embodiment, the stretching roller 16 also functions as a driving roller for driving the intermediary transfer belt 80. The respective color image forming processes performed in parallel by the image forming portions Pa to Pd are carried out at timings when the associated toner image is superposedly transferred onto the upstream toner image primarily transferred onto the intermediary transfer belt 80. As a result, finally, a full-color toner image is formed on the intermediary transfer belt 80 and is conveyed to the secondary transfer portion T2. Incidentally, secondary transfer residual toner after passing through the secondary transfer portion T2 is removed from the intermediary transfer belt 80 by a transfer cleaner 22.

In the above, by the above-described feeding process and the above-described image forming process, in the secondary transfer portion T2, the timing of the recording material S and the timing of the full-color toner image coincide with each other, so that secondary transfer is carried out. Thereafter, the recording material S is conveyed to a fixing device 50, in which heat and pressure are applied to the recording material S, so that the toner image is fixed on the recording material S. The fixing device 50 as a fixing portion nips and feeds the recording material S on which the toner image is formed, and applies heat and pressure to the fed recording material S, so that the fixing device 50 fixes the toner image on the recording material S. That is, the toner of the toner image formed on the recording material S is melted and mixed, and is fixed as the full-color image on the recording material S. Thus, a series of the image forming processes is ended. Then, in the case of this embodiment, the recording material S on which the toner image is fixed is conveyed from the image forming apparatus 100 to the varnish coater 200.

<Developing Device>

In the image forming apparatus 100, a two-component developer containing the toner and a carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow (Y), magenta (M), cyan (C), and black (K), respectively, but the black toner (first toner) contains carbon black, and the toners (second toners) of yellow, magenta, and cyan do not contain the carbon black.

As the parting agent, for example, it is possible to cite aliphatic hydrocarbon waxes such as low-molecular weight polyethylene, low-molecular weight olefin copolymer wax, microcrystallin wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

In the case of this embodiment, in the image data, data relating to the varnish image formed by the varnish coater 200 is also contained. That is, the varnish image data (second image data) relating to the varnish image is set separately from toner image data (first image data) relating to the toner images of the four colors YMCK. In the data relating to the varnish image contained in the image data, similar to the data relating to the toner images, for each of pages, an individual varnish image is associated with a coordinate of an image forming region on the recording material S.

<Varnish Coater>

Figure 2:
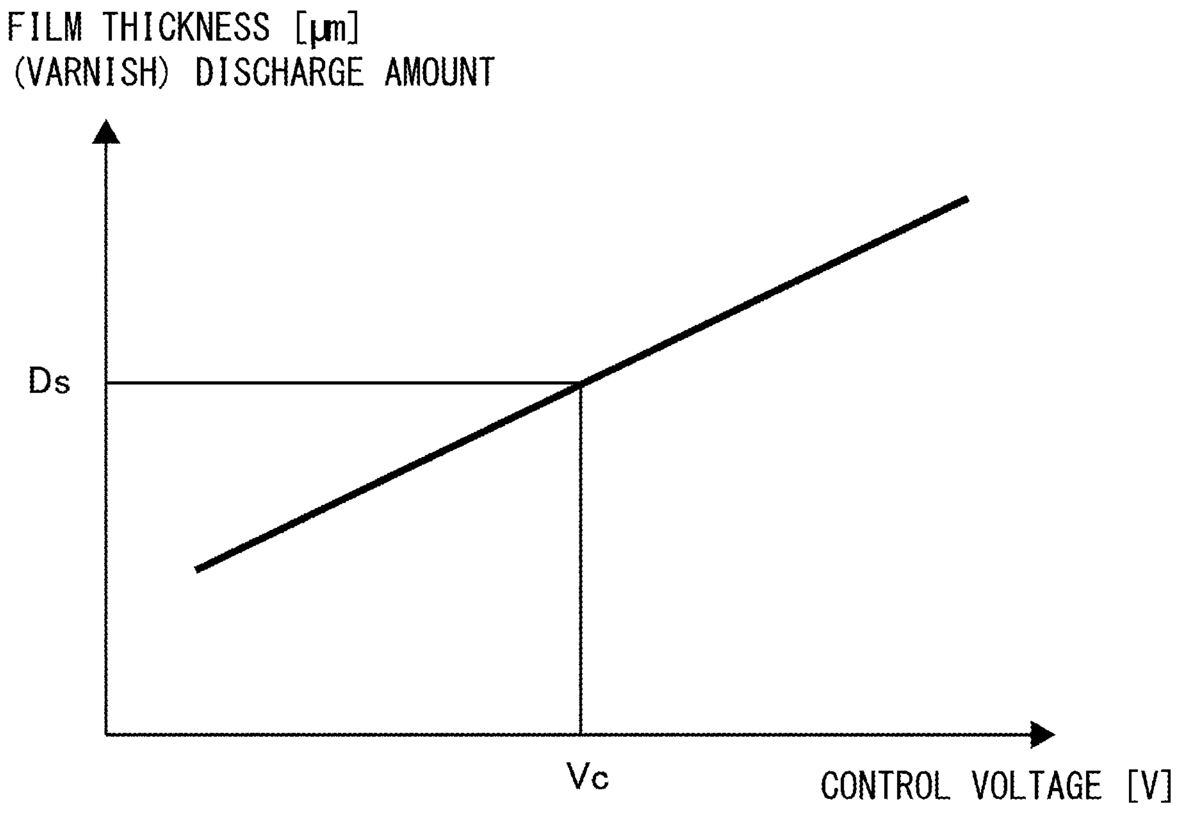
FIG. 2 is a graph showing a relationship between a control voltage and a film thickness which relate to formation of a varnish image.

Next, the varnish coater 200 will be described using FIGS. 1 and 2. The varnish coater 200 is a varnish applying apparatus of an ink jet type capable of forming varnish images such as characters, diagrams, graphics, and the like, which are desired by users. In the case of the ink jet type, varnish is ejected as droplets toward the recording material S, so that the varnish is deposited on the recording material S and thus the varnish image is formed. Incidentally, as the varnish, various species of the varnish such as aqueous varnish, oil varnish, and UV varnish may be used. In the following, the varnish coater 200 for forming the varnish image with use of UV (ultraviolet) varnish of a UV type solidified by UV irradiation will be described as an example.

The varnish coater 200 includes a sheet feeding portion 241, a position detecting portion 245, a varnish discharging (ejecting) portion 246, and a varnish solidifying portion 247. The sheet feeding portion 241 feeds the recording material S while attracting the recording material S to a belt feeding surface by an air sucking device (not shown) through holes formed in a feeding belt 242. Along a sheet feeding passage of this sheet feeding portion 241, in an order from an upstream side toward a downstream side of a feeding direction (arrow X direction) of the recording material S, the position detecting portion 245, the varnish ejecting portion 246, and the varnish solidifying portion 247 are disposed. The position detecting portion 245 is a detecting portion using a CCD, or the like, for example, and with respect to the recording material S fed while being sucked on the belt feeding surface, the position detecting portion 245 detects each of a position of a leading end of the recording material S with respect to the feeding direction, a position of each of opposing end portions with respect to a widthwise direction, and a position of the toner image on the recording material S. The position of the toner image is detected by the position detecting portion 245, so that the varnish coater 200 is capable of overprinting the varnish image superposedly on the toner image.

The varnish ejecting portion 246 as a varnish applying unit forms the varnish image on the recording material S by discharging (ejecting) and applying the varnish onto one surface (side) of the recording material S fed by the sheet feeding portion 241. The varnish ejecting portion 246 includes a plurality of print heads (not shown). The print heads are, for example, heads of a line type, in which a plurality of discharge (ejection) ports (not shown) are arranged and disposed in the widthwise direction crossing the feeding direction of the recording material S. A varnish discharging (ejecting) method of the print heads may employ a type using heat generating elements, a type using piezo electric elements, a type using electrostatic elements, a type using MEMS elements, and the like. Although illustration is omitted, the UV varnish is supplied from a tank to the associated one of the print heads through a tube.

A film thickness of the varnish image is influenced by an application amount per unit area of the UV varnish onto the recording material S. The varnish amount can be changed by adjusting a varnish discharge (ejection) amount from the print heads. For example, in the case of the type using the piezoelectric elements, as shown in FIG. 2, the varnish ejection amount varies depending on adjustment of a control voltage, and the film thickness of the varnish image is adjusted depending on an increase and a decrease in varnish ejection amount per unit area. In the case of this embodiment, the film thickness of the varnish image is adjusted in a range of, for example, "5-100 μm", preferably "10-70 μm".

Further, a resolution of the varnish image capable of being formed by the varnish coater 200 is, for example, "600 dpi", and in that case, the line width of the varnish image is adjusted in a "600 dpi" unit. Incidentally, the above-described range of the film thickness of the varnish image, the resolution of the varnish image, and an adjusting range of the line width of the varnish image may be appropriately changed depending on the varnish ejecting method of the print heads, a kind of the varnish, and the like.

Returning to FIG. 1, the recording material S on which the varnish image is formed on one surface thereof by the varnish ejecting portion 246 is sent by the sheet feeding portion 241 to the varnish solidifying portion 247 positioned downstream of the varnish ejecting portion 246 with respect to the feeding direction, and then the UV varnish on the recording material S is solidified by the varnish solidifying portion 247. The varnish solidifying portion 247 as an irradiation portion includes a UV lamp, and the UV lamp irradiates the UV varnish with rays (ultraviolet radiation) of a predetermined wavelength corresponding to the UV varnish. The UV lamp is disposed in an almost entire region of the recording material S with respect to the widthwise direction so as to be capable of emitting the UV light UV radiation, and is turned on only during passing of the recording material S. As described above, the varnish image is overprinted superposedly on the toner image formed on the recording material S.

The UV varnish used in this embodiment contains, as a main component, a photosensitive resin, a photosensitive monomer, a photoinitiator, an additive, and the like. As the photosensitive resin, for example, acrylic resin or the like having a (meth)acryloyl group is cited. As the photosensitive monomer, for example, a monomer, an oligomer, or the like in which at least one (meth)acryloyl group is contained in a molecule is cited. As the photoinitiator, for example, acetophenone, benzoin ethyl ether, 1-hydroxycyclohexyl phenyl ketone, or the like is cited. As the additive, for example, wax, plasticizer, leveling agent, solvent, polymerization inhibitor, antioxidant, photosensitizer, antifoaming agent, or the like is cited. The UV varnish may contain one or two or more species of these materials. Contents of respective components are not particularly limited, but it is preferable that the UV varnish contains the photosensitive resin in "1-20 wt. %", the photosensitive monomer in "30-70 wt. %", the photoinitiator in "5-15 wt. %", and the additive in "5 wt. %" or less, for example. As the UV varnish, it is possible to use, for example, "UV L Carton OP varnish (trade name)", "UV L Gloss OP varnish (tradename)", "UV Matt OP varnish (trade name)" and the like (manufactured by T&K TOKA Co., Ltd.).

Next, a control constitution of an image forming control system in the image forming system 1X will be described using FIG. 3 while making reference to FIG. 1. In the image forming unit 1X, an example in which the image forming apparatus 100 (specifically, the main controller 101) unitarily manages and controls an operation instruction to the varnish coater 200 was cited. Incidentally, to a main controller 101 and a varnish processing controller which are described later, in addition to the devices (portions) illustrated in FIG. 3, various devices such as motors and power sources are connected, but herein will be omitted from illustration and description.

Figure 3:
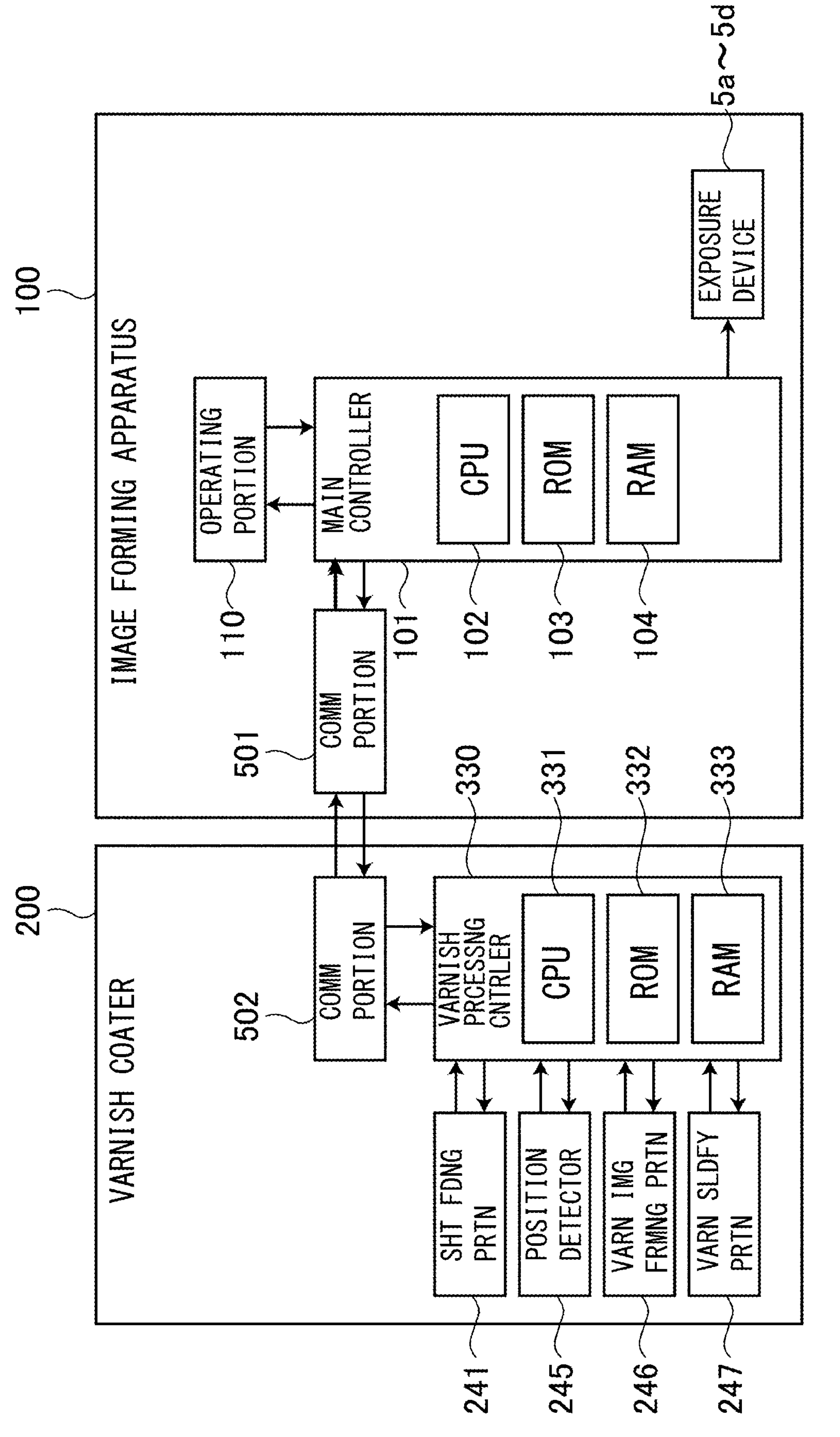
FIG. 3 is a control block diagram of an image forming control system in the image forming system.

In the image forming system 1X of this embodiment, as shown in FIG. 3, to the main controller 101 as a controller, the varnish processing controller 330 is connected via communication cable portions 501 and 502 so as to be capable of communicating operation instructions and various data. In accordance with the operation instructions from the main controller 101, the varnish processing controller 330 causes the varnish coater 200 to operate. That is, while the main controller 101 controls the operation of the image forming apparatus 100, the main controller 101 is capable of controlling the entirety of the image forming system 1X including the varnish coater 200 by sending the operation instructions and the various data to the varnish coater 200. At this time, the main controller 101 is capable of acquiring image data containing data relating to the toner image or the varnish image formed on the recording material S.

The above-described main controller 101 and the above-described varnish processing controller 330 may have the same constitution. For example, each of the controllers includes a CPU (central processing unit), a ROM (read only memory), and a RAM (random access memory).

The main controller 101 includes the CPU 102, the ROM 103, and the RAM 104. In the ROM 103, various programs such as "image forming processing" (see FIG. 5), which will be described later, are stored. In the RAM 104, various data such as image data acquired from, for example, an operating portion 110 or the external device 1000 (see FIG. 1), are stored. Incidentally, the RAM 104 is capable of temporarily storing a calculation (computation) processing result or the like with execution of the various programs.

The image forming apparatus 100 includes an operating portion 110 including, for example, a liquid crystal display portion 111 (see FIG. 1), and the operating portion 110 is connected to the main controller 101. The operating portion 110 as an input portion is, for example, a touch panel. On the liquid crystal display portion 111, various screens presenting the various programs and various data or the like can be displayed by the operating portion 110. Further, the operating portion 110 receives input of a start of the various programs and input of the various data, and the like, depending on a screen touch operation by a user. On the touch panel, a screen including various buttons, switches, and the like as software keys are displayed.

The user is capable of inputting a start of an image forming job from the operating portion 110. In the case where the start of the image forming job is inputted, the CPU 102 executes "image forming processing (program)" (see FIG. 5) stored in the ROM 103. With this execution, together with the image forming apparatus 100, the varnish coater 200 is operated, so that the toner image and the varnish image are formed on the recording material S.

The main controller 101 acquires, as an acquiring portion, first information on an electrostatic latent image exposed by the exposure device 5*d* and a plurality of pieces of second information on electrostatic latent images exposed by the exposure devices 5*a* to 5*c*, on the basis of toner image data contained in the image data. Then, when the toner image is formed by the image forming apparatus 100, the main controller 101 controls the exposure device 5*d* so as to form the electrostatic latent image on the photosensitive drum 3*d* depending on the first information and controls the exposure devices 5*a* to 5*c* so as to form the electrostatic latent images on the photosensitive drums 3*a* to 3*c* depending on the plurality of pieces of the second information.

The varnish processing controller 330 includes a CPU 331, a ROM 332, and a RAM 333. The CPU 331 causes the sheet feeding portion 241, the position detecting portion 245, the varnish ejecting portion 246, and the varnish solidifying portion 247 of the varnish coater 200 to operate on the basis of a control program stored in the ROM 332. When the varnish processing controller 330 receives the varnish image data from the main controller 101, the varnish processing controller 330 causes the RAM 333 to store the received varnish image data, and then controls the varnish coater 200 so as to form the varnish image on the recording material S, on the basis of this varnish image data.

Figure 4:
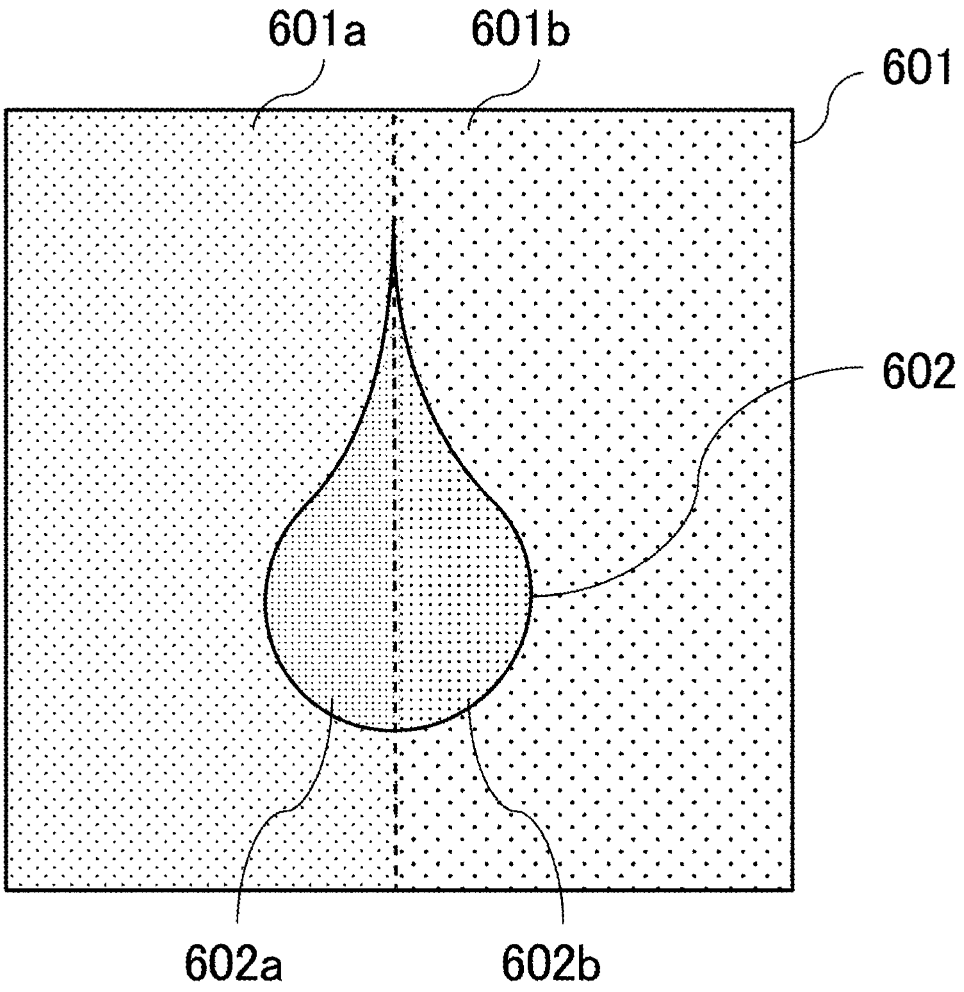
FIG. 4 is a schematic view showing an example of a toner image and the varnish image.

Incidentally, as already described above, in a conventional apparatus in which the varnish image is formed with the UV varnish cured by the ultraviolet radiation, there was a liability that a color tint of the toner image at a portion where the toner image and the varnish image are superposed with each other is changed. Particularly, in the case where the toner image is a black toner image formed with only black toner containing carbon black, a change in color tint was conspicuous. FIG. 4 is a schematic view showing an example of the toner image and the varnish image, in which a square toner image 601 and a droplet-like varnish image 602 which are formed on the recording material S are schematically illustrated.

In each of the toner image data and the varnish image data, coordinate positions of many dots (pixels) constituting the toner image 601 or the varnish image 602 on the recording material S, and the like are contained. In FIG. 4, on the basis of the toner image data, of the toner image 601, a left(-hand) region which is a left-half portion is formed with only the black toner, and a right(-hand) region which is a right-half portion is formed with at least one of yellow toner, magenta toner, and cyan toner. Further, on the basis of the varnish image data, the varnish image 602 is formed superposedly on the toner image 601. In the case of the example of FIG. 4, an overlapping region in which the varnish image 602 is formed superposedly on the toner image 601 is an entire region (first region 602*a* and second region 602*b*) of the varnish image 602. The varnish image 602 includes the first region 602*a* which is a left-half portion overlapping with the left region 601*a* formed with only the black toner and includes the second region 602*b* which is a right-half portion overlapping with the right region 601*b* formed with the toners of the colors other than the black toner.

Conventionally, in the case where the varnish image 602 is formed superposedly on the toner image 601 by using the UV varnish, there was a liability that the toner is discolored at a part of the left region 601*a* and the color tint of the toner image 601 is changed. This is because both the UV varnish and the carbon black generate heat by the influence of the ultraviolet radiation irradiated when the UV varnish is solidified and thus of the left region 601*a*, a portion (hereinafter, for discrimination, this portion is referred to as a black overlapping portion) overlapping with the first region 602*a* of the varnish image 602 reaches a higher temperature than another portion. Therefore, in the image forming apparatus 100, in the case where the varnish image 602 is formed superposedly on the toner image 601, in order to prevent the color tint of the toner image 601 from being changed, heat generation of the toner due to the carbon black was suppressed. In the following, description of such will be made.

<Image Forming Process>

The "image forming process" of this embodiment will be described using FIGS. 4 and 5 while making reference to FIG. 3. The "image forming process" is started by the main controller 101 with input of a start of the image forming job and is repeated until an end of the image forming job.

Figure 5:
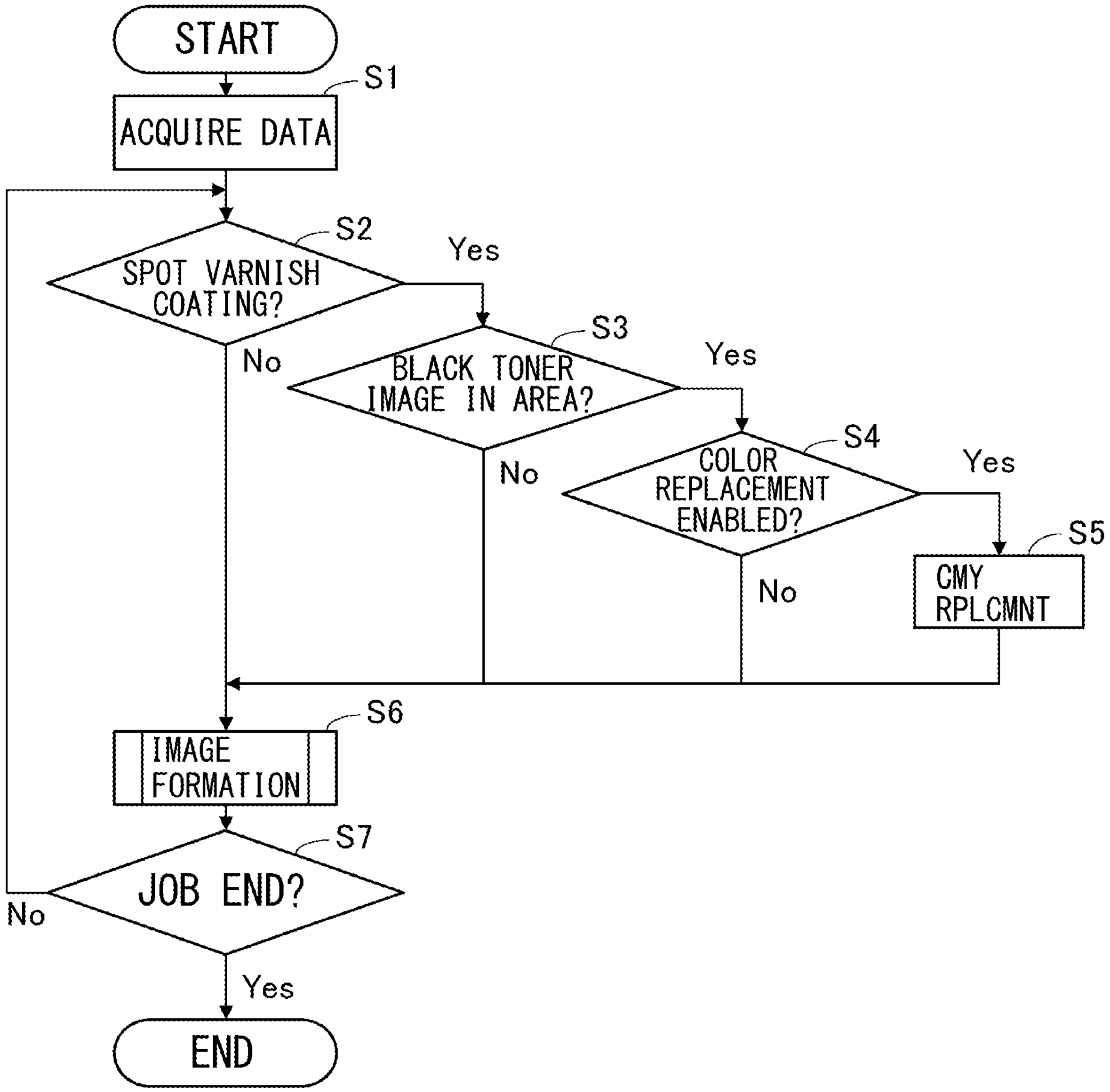
FIG. 5 is a flow chart showing an image forming process in a first embodiment.

As shown in FIG. 5, the main controller 101 acquires image data stored in the RAM 104 with the start of the image forming job (S1). The main controller 101 makes reference to the acquired image data and discriminates whether or not spot varnish coating should be performed (S2). When the image data contains varnish image data, the main controller 101 discriminates that the spot varnish coating should be performed. In the case of an example shown in FIG. 5, in the image data, the varnish image data relating to the varnish image 602 is included together with the toner image data relating to the toner image 601. In the case where the varnish image data is not included in the image data (No of S2), the main controller 101 causes the image forming apparatus 100 to perform the image forming process for forming the toner image on the basis of the toner image data (S6). At this time, on the basis of the first information and the plurality of pieces of the second information which are acquired from toner image data, the main controller 101 causes the exposure devices 5*a* to 5*d* to form the electrostatic latent images on the photosensitive drums 3*a* to 3*d*. In the case where, if the varnish image 602 is not formed in an example shown in FIG. 4, the electrostatic latent image for forming the left region 601*a* of the toner image 601 on the photosensitive drum 3*d* is formed by the exposure device 5*d* in accordance with the first information, and the electrostatic latent images for forming the right region 601*b* of the toner image 601 on the photosensitive drums 3*a* to 3*c* are formed by the exposure devices 5*a* to 5*c* in accordance with the plurality of pieces of the second information. Incidentally, in this case, there is no varnish image data, and therefore, the main controller 101 is not capable of causing the varnish coater 200 to form the varnish image 602. Thereafter, the main controller 101 causes the process to go to a step S7.

In the case where the varnish image data is included in the image data (Yes of S2), the main controller 101 discriminates in accordance with the first information whether or not there is a toner image formed with only the black toner (a black image) in an overlapping region (area) in which the varnish image is formed superposedly on the toner image (S3). The main controller 101 compares the toner image data with the varnish image data, and in the case where there are both of the varnish image and the toner image formed with only the black toner (hereinafter, this toner image is referred to as a black toner image) in the same coordinate, the main controller 101 discriminates that there is the black toner image (the black image) in the overlapping region. In the case of the example shown in FIG. 4, in the overlapping region (the first region 602*a* and the second region 602*b*) between the toner image 601 and the varnish image 602, a coordinate of the first region 602*a* and a part of coordinates of the left region 601*a* of the black toner image (the black image) are the same coordinate, and therefore, discrimination that there is the black toner image (the black image) in the overlapping region is made. Thus, the main controller 101 is capable of recognizing, as a recognizing portion, the overlapping region in which the varnish image is formed superposed on the toner image, on the basis of the toner image data and the varnish image data.

In the case where there is no black toner image (the black image) in the overlapping region (No of S3), the main controller 101 causes the image forming apparatus 100 to form the toner image on the basis of the toner image data and causes the varnish coater 200 to perform the image forming process for forming the varnish image on the basis of the varnish image data (S6). In this case, the main controller 101 causes the image forming apparatus 100 to form the toner images without changing the first information and the second information on the basis of the toner image data. Thereafter, the main controller 101 causes the process to go to the step S7.

On the other hand, in the case where there is the black toner image (the black image) in the overlapping region (Yes of S3), the main controller 101 discriminates whether or not a function of forming the black toner image (see the left region 601*a*) having a range overlapping with the varnish image without using the black toner is enabled (S4). The user is capable of arbitrarily making setting of enabling/disabling of the function of forming the black toner image without using the black toner through the operating portion 110. In the case where the function of forming the black toner image without using the black toner is disabled (No of S4), the main controller 101 carries out image forming developing in which the main controller 101 causes the image forming apparatus 100 to form the toner image on the basis of the toner image data and causes the varnish coater 200 to form the toner image on the basis of the varnish image data (S6). In this case, the main controller 101 causes the image forming apparatus 100 to form the toner image 601 without changing the first information and the second information based on the toner image data. Thereafter, the main controller 101 causes the process to go to the step S7.

In the case where the function of forming the black toner image (the black image) without using the black toner is enabled (Yes of S4), the main controller 101 changes the first information and the plurality of pieces of the second information for a region in which the varnish image and the black toner image overlap with each other (S5). For example, of the left region 601*a* which is the black toner image, with respect to the black overlapping portion overlapping with the first region 602*a* of the varnish image 602, the first information and the plurality of pieces of the second information are changed. That is, the first information and the plurality of pieces of the second information for a range excluding the black overlapping portion, overlapping with the first region 602*a*, of the toner image 601 are not changed.

In the case where there is the black overlapping portion (to which the first region 602*a* corresponds) in the overlapping region, the main controller 101 changes the first information and the plurality of pieces of the second information so as to form the toner image with the cyan toner, the magenta toner, and the yellow toner without using the black toner. For the range overlapping with the first region 602*a* of the varnish image 602, the main controller 101 changes the first information using only the black toner to the second information using the cyan toner, the magenta toner, and the yellow toner. The main controller 101 carries out an image process for replacing the black toner image data with the yellow toner image data, the magenta toner image data, and the cyan toner image data. Incidentally, in an image forming apparatus in which toner image data of Y (yellow), M (magenta), and C (cyan) are generated from image data of R (red), G (green), and B (blue) and then are subjected to UCR (under color removal) processing, a constitution in which the main controller 101 does not subject the toner image data for the black overlapping portion to the UCR processing may be employed. The main controller 101 controls the image process to which the image data is subjected so that the black overlapping portion is formed with the yellow toner, the magenta toner, and the yellow toner without using the black toner. By this, an amount of the black toner deposited on the black overlapping portion is controlled.

The toner image formed with the toners of three colors of CMY is an approximate black toner image (a process black image) intended to express an approximate color close to the black of the black toner image (the black image) formed with only the black toner, and as the second information, an areal ratio of each of the cyan (C) toner, the magenta (M) toner, and the yellow (Y) toner is defined. In the case of this embodiment, the areal ratio of each of the cyan toner, the magenta toner, and the yellow toner is defined so as to be "80%" for cyan, "75%" for magenta, and "60%" for yellow in terms of an optical density basis. Incidentally, the black toner is defined as "0%". In the following description, in the case were a maximum toner application amount (maximum toner deposition amount) per unit area of each of the toner images is "100%", a ratio thereto of a toner application amount (toner deposition amount) per unit area of each of actually formed toner images is referred to as an "areal ratio".

Then, the main controller 101 performs image output for forming not only the toner image on the basis of the first information and the plurality of pieces of the second information after the change but also the toner image on the basis of the varnish image (S6). In this case, in the range overlapping with the first region 602*a*, the main controller 101 forms the approximate black toner image (the process black image) with the toners of the three colors of cyan, magenta, and yellow without using the black toner. The approximate black toner image formed with the cyan toner, the magenta toner, and the yellow toner does not contain the carbon black. Thereafter, the main controller 101 causes the process to go to the step S7.

In the process of the step S7, the main controller 101 discriminates whether or not the image forming job is ended (S7). In the case where the image forming job is ended (Yes of S7), the main controller 101 ends the "image forming process". In the case where the image forming job is not ended (No of S7), the main controller 101 causes the process to return to the process of the step S2, and executes processes of the above-described steps S2 to S5 on the basis of image data for a subsequent page.

The present inventors conducted an experiment in which occurrence or non-occurrence of discoloration of the toner image was determined in both the case where the toner image was formed with only the black toner (K toner) and the case where the toner image was formed with the toners of the three colors of cyan, magenta, and yellow (hereinafter, simply referred to as CMY toner). A table 1 shows an experimental result.

TABLE 1

| TONER USED | CMY | ONLY K |
|---|---|---|
| KTAR*[1] | 0% | 100% |
| OOS*[2] | NO | YES |

*[1]"KTAR" is the K toner areal ratio in the black overlapping portion.
*[2]"OOS" is occurrence of scorch (discoloration).

The experiment was conducted in the following manner. First, the toner image was formed on the recording material S on the basis of predetermined image information. The predetermined image information referred to herein is image information (first information) such that the areal ratio of the black is "100%" in the case where only the toner black (K) is used as described in a column of "TONER USED" in the table 1. In the case where the cyan toner, the magenta toner, and the yellow toner are used, the predetermined image information refers to image information (second information) determined on the basis of the known art and image information (first information) such that the areal ratio of the black is "0%", which are capable of expressing the black comparable to the black of the image formed with only the black toner. The image information such that the areal ratio of the black is "100%" corresponds to the first information before the change, and the image information such that the areal ratio of the black in the case where the cyan toner, the magenta toner, and the yellow toner are used corresponds to the first information after the change.

Then, on each of the toner image formed with only the black toner and the toner image formed with the C toner, the M toner, and the Y toner, a varnish image was formed superposedly in a thickness of "40 μm" by a UV coater ("DDC-810", manufactured by Duplo Corp.). Then, the recording material S on which the varnish image and each of the black toner image (the black image) and the above-described toner image were formed was irradiated with the ultraviolet radiation, so that the UV varnish was cured. Finally, the present inventors checked the toner image by eye observation and discriminated whether or not the discoloration of the toner image occurred (occurrence or non-occurrence of scorch).

As can be understood from the table 1, in the case where only the black toner is used, in addition to heat generation with curing of the UV varnish due to irradiation with the ultraviolet radiation, by the influence of heat generation of the carbon black, discoloration of the toner image due to the heat occurred. On the other hand, in the case where the cyan toner, the magenta toner, and the yellow toner are used, due to the irradiation with the ultraviolet radiation, the heat generation with the curing of the UV varnish occurred, but the cyan toner, the magenta toner, and the yellow toner do not contain the carbon black, and therefore, the heat generation due to the carbon black did not occur, and the discoloration of the toner image due to the heat did not occur.

As described above, in the case where there is a portion formed with only the black toner in the overlapping region between the toner image and the varnish image, the image forming apparatus 100 forms the approximate black toner image (the process black image) using the toners of the three colors of the cyan, the magenta, and the yellow without using the black toner in the portion. The approximate black toner image formed with the toners of CMY has an approximate color (a process black) close to the black of the black toner image and does not contain the carbon black different from the black toner image. Therefore, even when the varnish image is irradiated with the ultraviolet radiation in order to solidify the varnish image, the heat generation due to the carbon black does not generate. Accordingly, even when the varnish generates heat with the irradiation with the ultraviolet radiation, the heat generation due to the carbon black does not generate and the temperature does not become high to the extent that the toner is discolored, so that the discoloration of the toner image due to the heat can be suppressed.

Second Embodiment

In the description of the first embodiment, the image forming apparatus 100 for forming the approximate black toner image (the process black image) with the cyan toner, the magenta toner, and the yellow toner without using the black toner was described, but the constitution in which the discoloration of the toner image due to the heat is not limited to the image forming apparatus 100 of the first embodiment. Although the color of the approximate black toner image formed with the cyan toner, the magenta toner, and the yellow toner is close to the black of the black toner image formed with only the black toner, a color of a combination of the black toner with the cyan toner, the magenta toner, and the Y toner can be made close to the black of the black toner image formed with only the black toner. Therefore, in the image forming unit 1X (the image forming apparatus 100) of a second embodiment, in order to make the color of a black toner image closer to the black of the black toner image formed with only the black toner, a combination of the CMY toner and the black toner (hereinafter, referred to as CMYK toner) was used.

Image forming processing in the second embodiment will be described using FIG. 6 while making reference to FIG. 3. However, the image forming processing in the second embodiment is, compared with the image forming processing (see FIG. 5) in the above-described first embodiment, only different in the process of the step S5 in the first embodiment, and other processes thereof are similar to those in the first embodiment. Therefore, in the following, principally as regards processes of the main controller 101 which are the same as those of the main controller 101 in the first embodiment, the same step numbers are added, and description thereof will be simplified or omitted.

Figure 6:
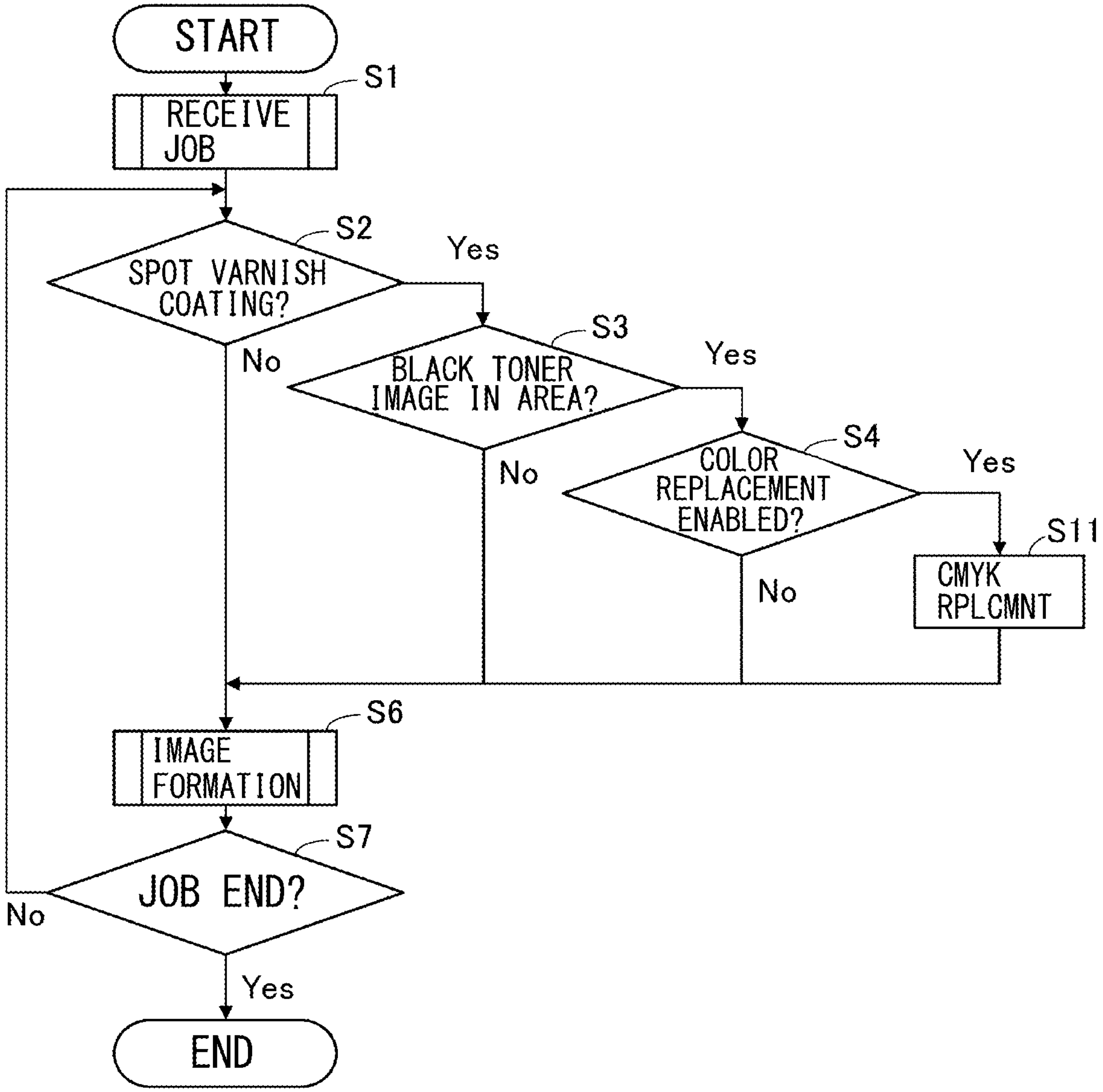
FIG. 6 is a flowchart showing an image forming process in a second embodiment.

As shown in FIG. 6, the main controller 101 acquires image data stored in the RAM 104 with the start of the image forming job (S1). The main controller 101 makes reference to the acquired image data and discriminates whether or not the image data includes the varnish image data and is for performing spot varnish coating (S2). In the case where the varnish image data is not included in the image data (No of S2), the main controller 101 causes the image forming apparatus 100 to perform image output for forming the toner image on the basis of the toner image data (S6). In this case, there is no varnish image data, and therefore, the main controller 101 does not cause the varnish coater 200 to form the varnish image. Thereafter, the main controller 101 causes the process to go to a step S7.

On the other hand, in the case where the varnish image data is included in the image data (Yes of S2), the main controller 101 discriminates in accordance with the first information whether or not there is a black toner image formed with only the black toner in an overlapping region (area) in which the varnish image is formed superposedly on the toner image (S3). In the case where there is no black toner image in the overlapping region (No of S3), the main controller 101 causes the image forming apparatus 100 to form the toner image on the basis of the toner image data and causes the varnish coater 200 to perform the image forming process for forming the varnish image on the basis of the varnish image data (S6). In this case, the main controller 101 causes the image forming apparatus 100 to form the toner images without changing the first information and the second information on the basis of the toner image data. Thereafter, the main controller 101 causes the process to go to the step S7.

On the other hand, in the case where there is the black toner image in the overlapping region (Yes of S3), the main controller 101 discriminates whether or not a function of forming the black toner image having a range overlapping with the varnish image without using the black toner is enabled (S4). In the case where the function of forming the black toner image without using the black toner is disabled (No of S4), the main controller 101 carries out image forming developing in which the main controller 101 causes the image forming apparatus 100 to form the toner image on the basis of the toner image data and causes the varnish coater 200 to form the toner image on the basis of the varnish image data (S6). In this case, the main controller 101 causes the image forming apparatus 100 to form the toner image 601 without changing the first information and the second information based on the toner image data. Thereafter, the main controller 101 causes the process to go to the step S7.

In the case where the function of forming the black toner image without using the black toner is enabled (Yes of S4), the main controller 101 changes, on the basis of the toner image data, the first information and the plurality of pieces of the second information for a region in which the varnish image and the black toner image overlap with each other (S11). For example, in the case of the example shown in FIG. 4, of the left region 601*a* which is the black toner image, with respect to the black overlapping portion overlapping with the first region 602*a* of the varnish image 602, the first information and the plurality of pieces of the second information are changed so that a black toner deposition amount is decreased. That is, the first information and the plurality of pieces of the second information for a range excluding the black overlapping portion, overlapping with the first region 602*a*, of the toner image 601 are not changed.

In the case of the second embodiment, for the black overlapping portion overlapping with the first region 602*a* of the varnish image 602, the first information using only the black toner is changed to the second information using the cyan toner, the magenta toner, and the yellow toner and the first information using only the black toner. That is, in a range overlapping with the first region 602*a* of the varnish image 602, the black toner deposition amount is decreased, and a process black toner image is formed with the cyan toner, the magenta toner, the yellow toner, and the black toner (CMYK toner).

In the case of the process black toner image formed with the CMYK toner, as the second information, an areal ratio of each of the cyan (C) toner, the magenta (M) toner, and the yellow (Y) toner is defined, and as the first information, an areal ratio of the black (K) toner is defined. In the case of this embodiment, the areal ratio of each of the cyan toner, the magenta toner, the yellow toner, and the black toner is defined so as to be "38%" for cyan, "36%" for magenta, and "43%" for yellow, and "67%" for black in terms of an optical density basis. The main controller 101 changes the first information so that the areal ratio of the toner image formed with the black toner relative to the varnish image in the black overlapping portion becomes smaller than the areal ratio in the case of the first information before the change.

For example, in the case where a certain application amount (black toner deposition amount) per unit area when the black toner image is a solid image (100%) is "0.5 $mg/cm^2$", it is confirmed by an experiment conducted by the present inventors that in the process black toner image decreased in black toner application amount (black toner deposition amount) (per unit area) to "0.45 $mg/cm^2$", the discoloration of the toner due to the heat does not occur in the black overlapping portion. However, when the black toner application amount (black toner deposition amount) is excessively decreased, there is a liability that the black comparable to the black of the black toner image cannot be expressed. The above-described areal ratio of "67%" for the black is smaller than "0.45 $mg/cm^2$" in terms of the black toner application amount (black toner deposition amount), and is a lower-limit value at which the black comparable to the black of the black toner image can be expressed. That is, the areal ratio for the black is defined as "67%" or more. Further, the black toner application amount (black toner deposition amount) of "0.45 mg/cm$^2$" is realized when the areal ratio for the black is "90%". Accordingly, in this embodiment, the areal ratio for the black may preferably be "67%" or more and "90%" or less.

Then, the main controller 101 performs image output for forming not only the toner image on the basis of the first information and the plurality of pieces of the second information after the change, but also the toner image on the basis of the varnish image (S6). In this case, in the range overlapping with the first region 602*a* (see FIG. 4), the main controller 101 forms the process black toner image with the toners of the four colors of cyan, magenta, yellow, and black without using only the black toner. The carbon black contained in this process black toner image is smaller in amount than in the black toner image before the change. Thereafter, the main controller 101 causes the process to go to the step S7.

The present inventors conducted an experiment in which occurrence or non-occurrence of discoloration of the toner image was determined in both the case where the toner image was formed with only the black toner (K toner) and the case where the toner image was formed with the toners of the four colors of cyan, magenta, yellow, and black (CMYK toner). A table 2 shows an experimental result. Incidentally, in the case where only the black toner was used, the areal ratio was set at "90%" and "100%".

TABLE 2

| TONER USED | CMYK | ONLY K | ONLY K |
|---|---|---|---|
| KTAR*[1] | <90% | 90% | 100% |
| OOS*[2] | NO | NO | YES |

*[1]"KTAR" is the K toner areal ratio in the black overlapping portion.
*[2]"OOS" is occurrence of scorch (discoloration).

The experiment was conducted in the following manner. First, the toner image was formed on the recording material S on the basis of predetermined image information. The predetermined image information referred to herein is image information such that the areal ratio of the black is determined so as to be "100%" in the case where only the black toner is used as described in a column of "TONER USED" in the table 2. In the case where the cyan toner, the magenta toner, the yellow toner, and the black toner (CMYK toner) are used, the predetermined image information refers to image information determined on the basis of the known art so as to provide an areal ratio capable of expressing the black comparable to the black of the image formed with only the black toner. In the image forming apparatus 100 in the second embodiment, image information in the case where only the black toner is used corresponds to the toner image data before the change, and image information in the case where the CMYK toner is used corresponds to the toner image data after the change. The toner image data before the change is "100%" in areal ratio, and the toner image data after the change is less than "90%" in areal ratio.

Then, on each of the toner image formed with only the black toner and the toner image formed with the CMYK toner, a varnish image was formed superposedly in a thickness of "40 μm" by a UV coater ("DDC-810", manufactured by Duplo Corp.). Then, the recording material S on which the varnish image and each of the black toner image and the above-described toner image were formed was irradiated with the ultraviolet radiation, so that the UV varnish was cured. Finally, the present inventors checked the toner image by eye observation and discriminated whether or not the discoloration of the toner image occurred.

As can be understood from the table 2, in the case where only the black toner is used to form the image with the areal ratio of "100%", in addition to heat generation with curing of the UV varnish due to irradiation with the ultraviolet radiation, by the influence of heat generation of the carbon black, discoloration of the toner image due to the heat occurred. On the other hand, in the case where the CMYK toner in which the black toner areal ratio is less than "90%" is used to form the image heat generation due to the irradiation of the carbon black with the ultraviolet radiation was suppressed, and the discoloration of the toner due to the heat did not occur.

Further, as in a comparison example, even in the case where the image is formed with only the black toner at the areal ratio of "90%", the heat generation due to the irradiation of the carbon black with the ultraviolet radiation was suppressed, and the discoloration of the toner did not occur. A weight per unit area of the black toner existing on the recording material in the case where the areal ratio is "100%" was "0.50 mg/cm$^2$", and a weight per unit area of the black toner existing on the recording material in the case where the areal ratio is "90%" is "0.45 mg/cm$^2$".

However, when the image is formed with only the black toner at the areal ratio of "90%" and when the image is formed with the CMY toner, compared with the case where the image is formed with the CMYK toner, reproducibility of the black in the case where the image is formed with only the black toner at the areal ratio of "100%" lowers. In view of this point, in the image forming apparatus 100 of the second embodiment, in order to reproduce the black in the case where the image is formed with only the black toner at the areal ratio of "100%", the toner image was formed with the CMYK toner.

As described above, in the case where there is a portion formed with only the black toner in the overlapping region between the toner image and the varnish image, the image forming unit 1X (image forming apparatus 100) of the second embodiment forms the process black toner image using the toners of the four colors of the cyan, the magenta, the yellow, and black. However, a use amount of the black toner is decreased while using the cyan toner, the magenta toner, and the yellow toner. The process black toner image formed with the CMYK toner has an approximate color close to the black of the black toner image and is small in amount of the carbon black different from the black toner image since the cyan toner, the magenta toner, and the cyan toner which do not contain the carbon black and the use amount of the black toner is decreased. Therefore, even when the varnish image is irradiated with the ultraviolet radiation in order to solidify the varnish image, the heat generation due to the carbon black becomes hard to generate. Accordingly, the temperature does not become high to the extent that the toner is discolored with the irradiation of the ultraviolet radiation, so that the discoloration of the toner image due to the heat can be suppressed.

According to the present disclosure, in the case where the varnish applied to the toner image formed with the toner containing the carbon black is solidified, the discoloration of the toner image can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110180 filed on Jul. 8, 2022, which is hereby incorporated by reference herein in its entirety.

What is claimed is:

1. An image forming system comprising:

an image forming unit configured to form a toner image on a recording material and including a first photosensitive member, a first developing unit for developing an electrostatic latent image, formed on the first photosensitive member, with black toner containing carbon black, a second photosensitive member, a second developing unit for developing an electrostatic latent image, formed on the second photosensitive member, with yellow toner not containing carbon black, a third photosensitive member, a third developing unit for developing an electrostatic latent image, formed on the third photosensitive member, with magenta toner not containing carbon black, a fourth photosensitive member, and a fourth developing unit for developing an electrostatic latent image, formed on the fourth photosensitive member, with cyan toner not containing carbon black;

a varnish applying unit configured to apply varnish to the recording material, wherein the varnish is cured by being irradiated with ultraviolet radiation;

an irradiation unit configured to irradiate the varnish on the recording material with light to cure the varnish on the recording material; and a controller configured to control image formation by the image forming unit to form the toner image in black (i) with the yellow toner, the magenta toner, and the cyan toner in a case in which the controller discriminates that the toner image in black to be formed by the image forming unit is to be superimposed with the varnish by the varnish applying unit, and (ii) with the black toner in a case in which the controller discriminates that the toner image in black to be formed by the image forming unit is not to be superimposed with the varnish by the varnish applying unit.

2. The image forming system according to claim 1, wherein the image forming unit forms the toner image on the basis of image data subjected to image processing.

3. The image forming system according to claim 1, wherein the controller causes the image forming unit to form the toner image in black, on which the varnish is to be superimposed, with the yellow toner, the magenta toner, and the cyan toner without using the black toner.

4. The image forming system according to claim 1, wherein the controller causes the image forming unit to form the toner image in black, on which the varnish is to be superimposed, with the yellow toner, the magenta toner, and the cyan toner in a manner such that an amount of the black toner in the toner image in black, on which the varnish is to be superimposed, is decreased as compared to a case of forming the toner image in black with only the black toner.

5. An image forming apparatus comprising:

an image forming unit configured to form a toner image on a recording material and including a first photosensitive member, a first developing unit for developing an electrostatic latent image, formed on the first photosensitive member, with black toner containing carbon black, a second photosensitive member, a second developing unit for developing an electrostatic latent image, formed on the second photosensitive member, with yellow toner not containing carbon black, a third photosensitive member, a third developing unit for developing an electrostatic latent image, formed on the third photosensitive member, with magenta toner not containing carbon black, a fourth photosensitive member, and a fourth developing unit for developing an electrostatic latent image, formed on the fourth photosensitive member, with cyan toner not containing carbon black; and a controller configured to control image formation by the image forming unit to form the toner image in black (i) with the yellow toner, the magenta toner, and the cyan toner in a case in which the controller discriminates that the toner image in black to be formed by the image forming unit is to be superimposed with varnish by a varnish applying unit, and (ii) with the black toner in a case in which the controller discriminates that the toner image in black to be formed by the image forming unit is not to be superimposed with the varnish by the varnish applying unit.

6. The image forming apparatus according to claim 5, wherein the image forming unit forms the toner image on the basis of image data subjected to image processing.

7. The image forming apparatus according to claim 5, wherein the controller causes the image forming unit to form the toner image in black, on which the varnish is to be superimposed, with the yellow toner, the magenta toner, and the cyan toner without using the black toner.

8. The image forming apparatus according to claim 5, wherein the controller causes the image forming unit to form the toner image in black, on which the varnish is to be superimposed, with the yellow toner, the magenta toner, and the cyan toner in a manner such that an amount of the black toner in the toner image in black, on which the varnish is to be superimposed, is decreased as compared to a case of forming the toner image in black with only the black toner.

* * * * *